United States Patent
Hosoi

(10) Patent No.: US 7,805,413 B2
(45) Date of Patent: Sep. 28, 2010

(54) ARRAY COMPRESSION METHOD

(75) Inventor: Akira Hosoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1289 days.

(21) Appl. No.: 10/741,591

(22) Filed: Dec. 22, 2003

(65) Prior Publication Data

US 2004/0260708 A1 Dec. 23, 2004

(30) Foreign Application Priority Data

Dec. 26, 2002 (JP) .............................. 2002-378747

(51) Int. Cl.
  *G06F 9/45* (2006.01)
  *G06F 7/00* (2006.01)
  *G06F 17/00* (2006.01)
  *G06F 17/30* (2006.01)
(52) U.S. Cl. .................... 707/693; 717/149; 717/150; 717/151; 717/159; 717/160; 707/999.101
(58) Field of Classification Search ............... 717/149, 717/150, 151, 159, 160; 707/693, 999.101
See application file for complete search history.

(56) References Cited

U.S. PATENT DOCUMENTS 6,281,816 B1 * 8/2001 Kampf ........................ 341/87
6,816,856 B2 * 11/2004 Baskins et al. ................. 707/4

OTHER PUBLICATIONS

Robert Lafore, The Waite Group's Microsoft C Programming for the PC, 1989, The Waite Group, Inc., Second Edition, pp. 64-90.*
Robert Lafore, The Waite Group's Microsoft C Programming for the PC Revised Edition, Howard W. Sams & Company, Second Edition, 216-217.*
Gao et al., "Collective Loop Fusion for Array Contraction", ACAPS Technical Memo 41, McGill University, 1992, pp. 1-22.

* cited by examiner

*Primary Examiner*—Kirsten S Apple
*Assistant Examiner*—Scott S Trotter
(74) *Attorney, Agent, or Firm*—Staas & Halsey LLP

(57) ABSTRACT

A program stored in a storage device is read. Partial compression, in the element in an array in a loop nest in the program, is performed by replacing an element local only in the loop nest in the entire program with a scalar variable. Access to an original array is inserted into a program for an non-local element.

4 Claims, 15 Drawing Sheets

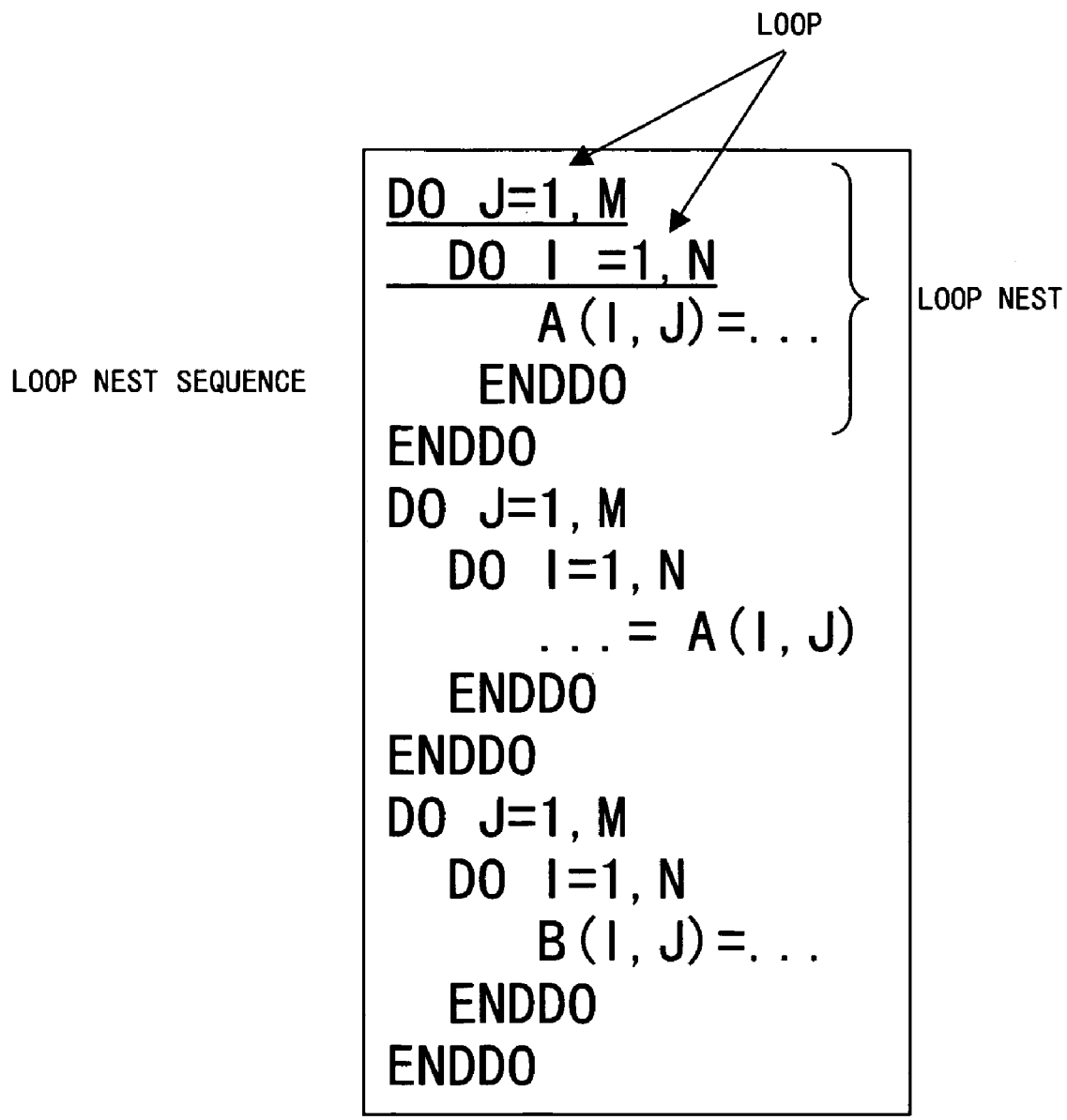
F I G. 1

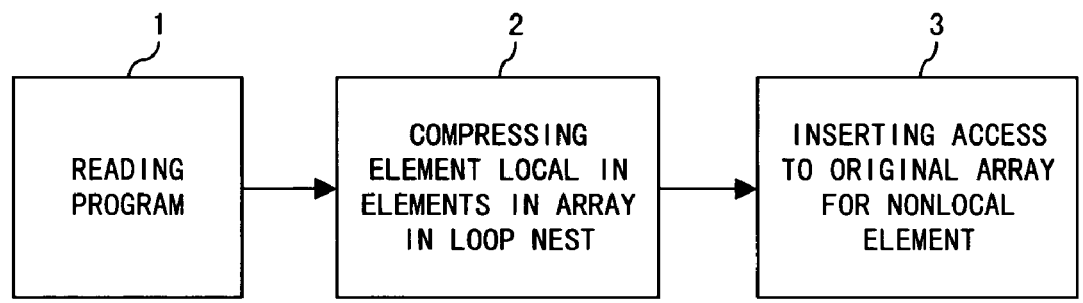
F I G. 3

```
DO I=1,N
   A(I)=...
ENDDO
```
(a)

```
DO I=1,N
   A(I)=...
   ...=A(I)
ENDDO
```
(b)

```
DO I=1,N
   if(2<=I .AND. I<=N-1) A(I)=...
   ...=A(I)
ENDDO
```
(c)

FIG. 5

```
DO I=1,N
   ...=A(I)
ENDDO
```
(a)

```
DO I=1,N
   ...=A(I)
   A(I)=
ENDDO
```
(b)

```
DO I=1,N
   if(K<=I .AND. I<=K+1) A(I)=...
   ...=A(I)
ENDDO
```
(c)

F I G. 6

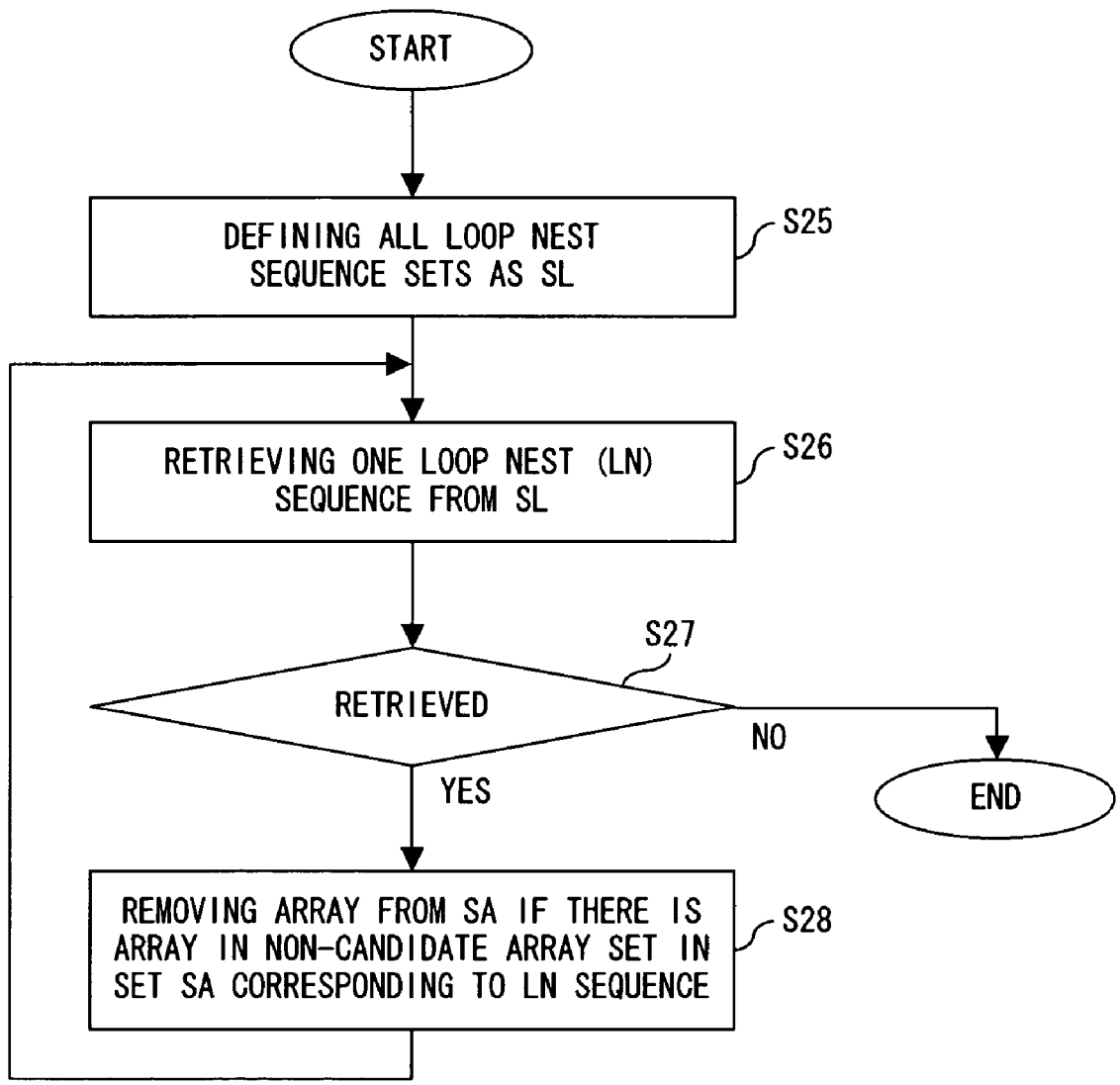
F I G. 1 1

```
DO J=1, M       Ln1
   DO I=1, N
      A(I, J)=C(I, J)+D(I, J)
   ENDDO
ENDDO

DO J=1, M       Ln2
   DO I=1, N
      E(I, J)=A(I, J)*F(I, J)
   ENDDO
ENDDO
```

FIG. 13

ARRAY COMPRESSION METHOD

CROSS REFERENCE TO RELATED APPLICATION

This application is based upon and claims the benefit of priority from the prior Japanese Patent Application No. 2002-378747filed on Dec. 26, 2002, the entire contents of which are incorporated herein by reference.

BACKGROUND OF THE INVENTION

1. Field of the Invention

The present invention relates to an array compression system for reducing the size of the array used in processing a large amount of data, that is, the number of elements of arrays, in a program.

2. Description of the Related Art

To efficiently execute a numerical calculation program, etc. which processes a large amount of data, it is necessary to effectively use cache, etc. To attain this, various methods have been suggested. An array compression method is one of the methods, and is an optimizing method by reducing the size of an array and improving the locality.

Before explaining the compression of an array, the terms relating to the arrays used in the present invention are described below. FIG. 1 is an explanatory view of an example of a loop nest sequence which is a sequence of loop nests. FIG. 1 shows the loop nest of an array A including leading subscripts I and J.

The loop nest takes on a nest structure having an outside loop relating to the subscript J and an inside loop relating to the subscript I. However, in the explanation below, even though there is no nested structure, it is still referred to as a loop nest.

Described below is the locality of an array. First, that an array A is local in an area R means that the elements of A defined or referenced in the area R are all local in the area R. An area is an arbitrary part of an entire program. Each of a loop nest and a loop nest sequence is an area.

Additionally, that an element e of the array A is local in the area R means that the first condition that the value of e referenced in the area R is necessarily defined in the area R before the reference, and that the second condition that the value of e defined in the area R is necessarily referenced only in the area R are satisfied.

FIG. 2 shows the conventional technology of array compression. In FIG. 2, a one-dimensional array T (I) is defined in the upper portion, and then the array A (I) is defined with the array T (I) referenced. If the contents of the array T (I) are not referenced in another area of the entire program, then the array formed by N elements from T (1) to T (N) can be described as a scalar variable T as shown in the lower portion of FIG. 2, and the size of the array can be reduced.

The above-mentioned conventional technology of array compression is described in the document relating to the technology of G. R. Gao et al, "Collective Loop Fusion For Array Contraction", ACAPS Technical Memo 41, Mcgill Univ. 1992, etc.

SUMMARY OF THE INVENTION

If all elements of the array A are local in the area R, there can be the possibility that the array A is compressed in the area R.

However, there are normally not many cases in which the condition is satisfied, and a problem exists where the effect of the array compression can be rarely obtained in the conventional compression system.

Furthermore, the above-mentioned document is a famous and basic thesis relating to the array compression, but the system of the thesis can only be applied to the case in which the depth of the nest is 1, thereby failing in realizing practical array compression.

The present invention has been developed to solve the above-mentioned problems, and aims at providing an array compression method capable of obtaining an effect of array compression eventhough all of the elements of the array A are not local in the area R.

A program stored in a storage device is read. In the elements in the arrays in a loop nest of a program, partial compression is performed by compressing only the elements local in the loop nest in the entire program and replacing the elements with scalar variables, thereby inserting access to the original array for an element which is not local.

In an embodiment of the present invention, in the search for a candidate array for compression in the loop nest sequence performed before the partial compression of an array, a loop nest whose array first appears in a loop nest sequence is obtained. If the array is a definition-preceded array including a number of elements preceded by a definition in the loop nest, then the array can be defined as a candidate array for compression in the loop nest sequence. In this case, in the search for a candidate array for compression in a program performed after the search for a candidate array for compression in a loop nest sequence, when one of the above-mentioned arrays is not defined as a candidate array for compression in another loop nest sequence, the array can be excluded from candidate arrays for compression.

In an embodiment of the present invention, in dividing a loop nest sequence, which is performed before performing partial compression, into a plurality of sub-loop-nest sequences, a definition-preceded loop nest whose candidate array for compression is definition-preceded in a loop nest can be a leader in the sub-loop-nest sequence.

Furthermore, in an embodiment of the present invention, in a fusion check of a loop nest in a sub-loop-nest sequence performed between division into sub-loop-nest sequences and partial compression, a loop for inverting the rotation direction for fusion of a loop nest in a sub-loop-nest sequence can be determined according to the information about the rotation direction that attained from a process of multidimensional parallelism, that is, the forward direction or the backward direction, indicating the change of direction of a variable of each loop, and the position of the occurrence of the loop variable in the subscripts of a candidate array for compression. Furthermore, a loop nest for inverting the order of loops can be determined according to the information about the order of loops in each loop nest, and the position of occurrence of a loop variable in the subscripts of a candidate array for compression.

In the array compression method of the present invention, a program stored in a storage device is read, a loop nest whose array first appears in the loop nest sequence in the program is obtained, the array is defined as a candidate array for compression in a loop nest sequence if the array is a definition-preceded array including a number of elements preceded by definitions in the loop nest, an array to be compressed is selected from among the candidate arrays for compression, and the selected arrays are compressed.

In this case, according to an embodiment of the present invention, the above-mentioned division of the loop nest sequence into sub-loop-nest sequences before the compression of an array can be executed, and a loop to be inverted in rotation direction and a loop nest to be inverted in loop order can also be determined as the said fusion check of a loop nest in a sub-loop-nest sequence after division into the sub-loop-nest sequence.

In the present invention, a program for use in a computer for reducing the size of an array in a program can be a program used to direct the computer to perform the procedure of reading a target program from a storage device, the procedure of performing partial compression by replacing a local element, only in a loop nest in the entire program, in the elements of an array in a loop nest in the program with a scalar variable, and the procedure of inserting access to the original array into a program for a non-local element.

As described above, according to the present invention, an array is partially compressed on a definition-preceded array which is a definition-preceded array to a certain area.

BRIEF DESCRIPTION OF THE DRAWINGS

FIG. 1 is an explanatory view of a loop nest and a loop nest sequence;

FIG. 3 is a block diagram of the functions showing the array compression system according to the present invention;

FIG. 5 shows an example of a definition-preceded loop nest;

FIG. 6 shows an example of a reference-preceded loop nest;

FIG. 11 is a flowchart of the process of searching for a candidate compression array in a program;

FIG. 13 shows a loop nest sequence to be processed in the fusion check;

DESCRIPTION OF THE PREFERRED EMBODIMENTS

FIG. 3 is a block diagram of the functions showing the principle of the array compression method for improving the locality by reducing the size of the array according to the present invention.

In FIG. 3, a program stored in the storage device is read in 1, only the elements local in the loop nest in the entire program are compressed in the elements of the arrays in the loop nest in the program and then replaced with scalar variables in 2, and access to the original array is inserted into the program for non-local elements in 3.

Figure 4:
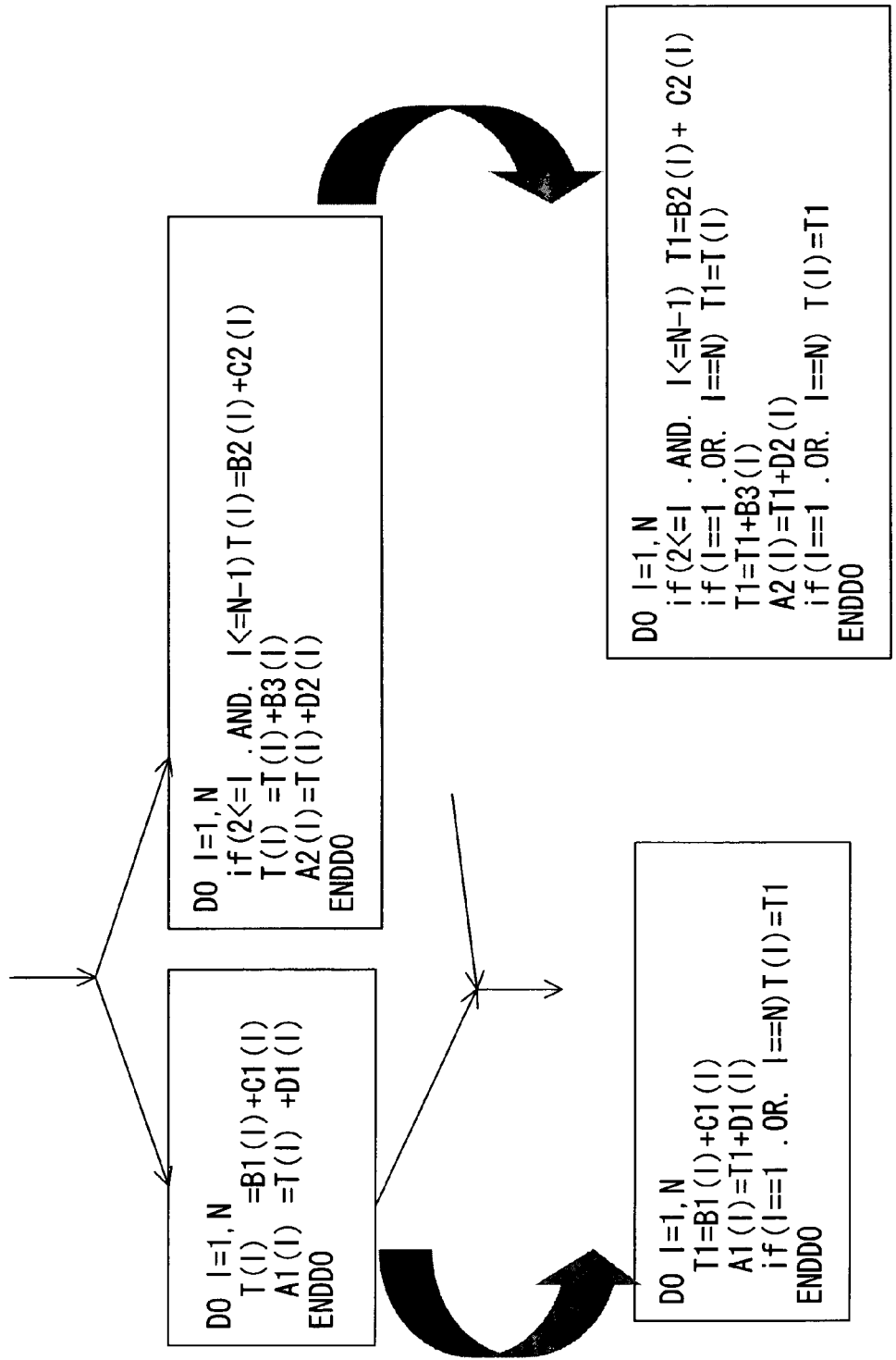
FIG. 4 is an explanatory view of the partial compression system of an array.

The partial compression of an array according to the present embodiment is described below by referring to FIG. 4. FIG. 4 shows a part of a program. The compression of the array T (I) in the program is considered as follows.

Either of the loop nests on the upper right and left shown in FIG. 4 is executed depending on the condition at the runtime of the program. However, at the next runtime, the process of the loop nest not performed in the previous runtime depending on the condition can be performed. Therefore, when the process of any loop nest is performed, it is necessary to compress an array not to generate inconsistencies among the elements of arrays in the entire program.

In the upper left loop nest, all elements of the array T (I), that is, from the element T (1) to the element T (N), are defined in the loop nest, and the values are referenced and used.

In the upper right loop nest, the elements T (2) through T (N−1) in the elements in the array T (I) are first defined in the loop nest, and the values are referenced. However, for the two elements T (1) and T (N), for example, the values stored in the memory are first referenced, and defined again in the loop nest.

Therefore, the elements local in the respective loop nest sequences in the elements of the array T (I) are T (2) through T (N−1) only, and the elements T (1) and T (N) are not local and therefore cannot be compressed. Assuming that partial compression is performed on the other elements, that is, partial compression is performed, the respective loop nests are transformed as shown in FIG. 4 and as described below.

Figure 2:
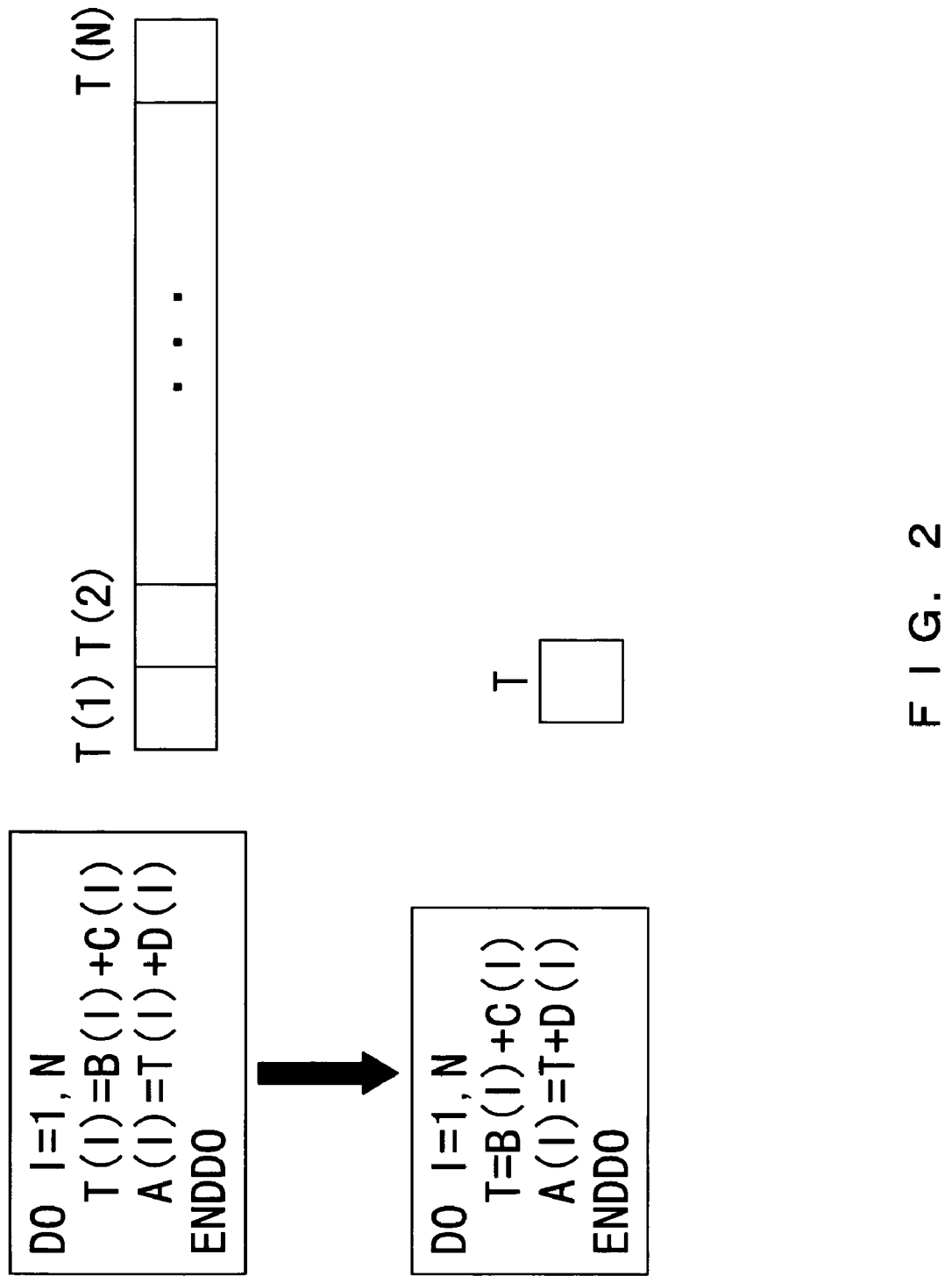
FIG. 2 is an explanatory view of the conventional system for array compression.

Although the array T (I) in the left loop nest is compressed into only one element T1 as in the conventional technology shown in FIG. 2, it is necessary to store, for example, in the memory the value of T1 as the element of the array T (I) for I=1 and I=N.

In the right loop nest, the array T (I) is replaced with one element T1 as in the left loop nest, but the value of T1 can be obtained by referencing the value of T (I) for I=1 and I=N. Finally, the value of T1 is stored in the memory, etc. as the element of the array T (I) for I=1 and N.

Thus, according to the present embodiment, when an array appears in, for example, two loop nests, only the elements local in the two loop nests are compressed. In the example shown in FIG. 4, if the value of N is large enough, the compressed elements, that is, the number of elements T (2) through T (N−1) is large, and the locality of the array can be improved by the partial compression of the array.

That a number of elements of an array are local in a loop nest is that a number of elements in the elements of an array A are first defined in the loop nest, and then referenced as necessary after the definition. To first define an array is referred to as a definition-preceded array. When all or most elements of the array A are definition-preceded in the loop nest, the loop nest is hereinafter referred to as a definition-preceded loop nest.

FIG. 5 shows an example of a definition-preceded loop nest corresponding to the array A. In (a), the definition of each element of A exists. In (b), the definitions of all elements of A precede references. In (c), elements from I=2 to I=N−1 are definition-preceded. If N is large enough, most elements of the array A are definition-preceded. Thus, it is a desired condition for partial compression that the array A is definition-preceded for the loop nest L.

On the other hand, when most elements in the elements of the array A are first referenced in the loop nest, that is, when the array A is reference-preceded for the loop nest, the number of elements to be stored in the memory is finally large as shown in FIG. 4 although the array A is partially compressed. This cannot always realize an efficient process on the whole.

FIG. 6 shows an example of the above-mentioned reference-preceded loop nest. In (a) in FIG. 6, all elements are referenced only. In (b), all elements are first referenced. In (c), only the two elements I=K and I=K+1 are definition-preceded, and most of other elements are reference-preceded.

Thus, to perform partial compression, it is desired that the array A is definition-preceded for the loop nest L, but it is rare that efficient array compression can be performed only by detecting a loop nest satisfying the condition. In most cases, an array can be compressed by fusing a plurality of loop nests.

Figure 7:
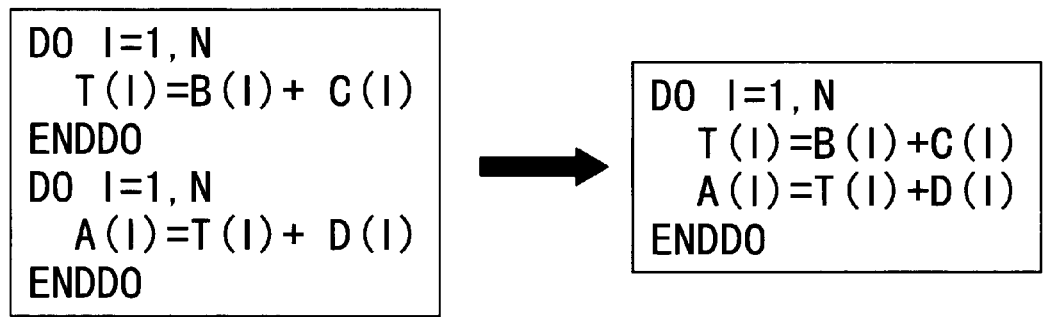
FIG. 7 is an explanatory view of an example of fusion of a loop nest.

FIG. 7 shows an example of the fusion of a loop nest. On the left in FIG. 7, an array can be compressed as described above by referring to FIG. 2 by fusing the two loop nests as shown on the right in the sequence of the loop nest in which T (I) is defined and the loop nest in which the array A (I) is defined by referencing a defined array T (I).

Figure 8:
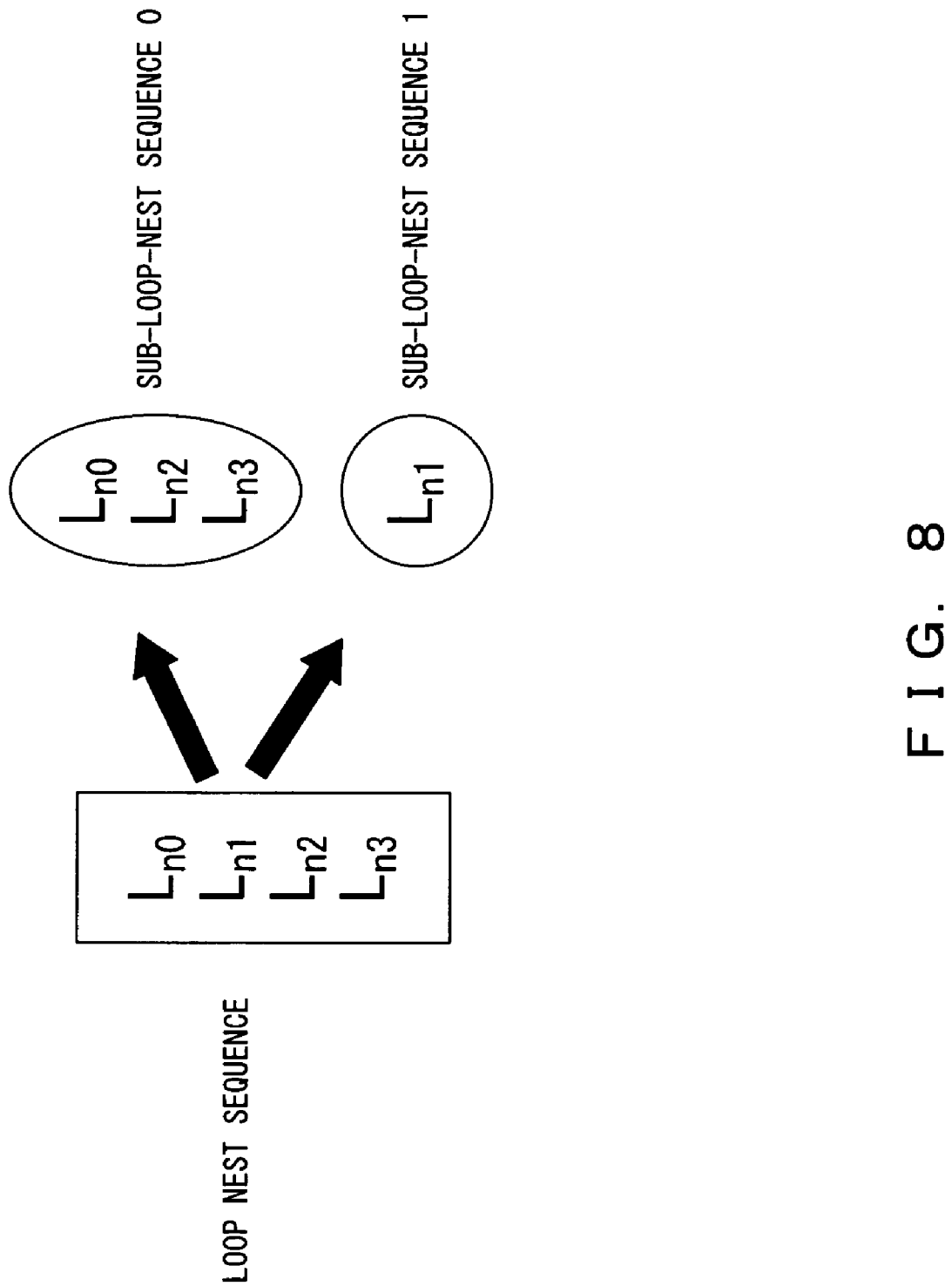
FIG. 8 is an explanatory view showing the division of a loop nest sequence.

To effectively perform array compression as described above, it is necessary to determine how to fuse a plurality of loop nests in the loop nest sequence. This corresponds to dividing a loop nest sequence into a plurality of sub-loop-nest sequences, and compressing an array in each sub-loop-nest sequence. FIG. 8 is an explanatory view of division into sub-loop-nest sequences. In FIG. 8, the loop nest sequence from the loop nest $L_{n0}$ to $L_{n3}$ is divided into a sub-loop-nest sequence 0 from a loop nest $L_{n0}$ to $L_{n2}$ and a sub-loop-nest sequence 1 including only a loop nest $L_{n3}$.

Figure 9:
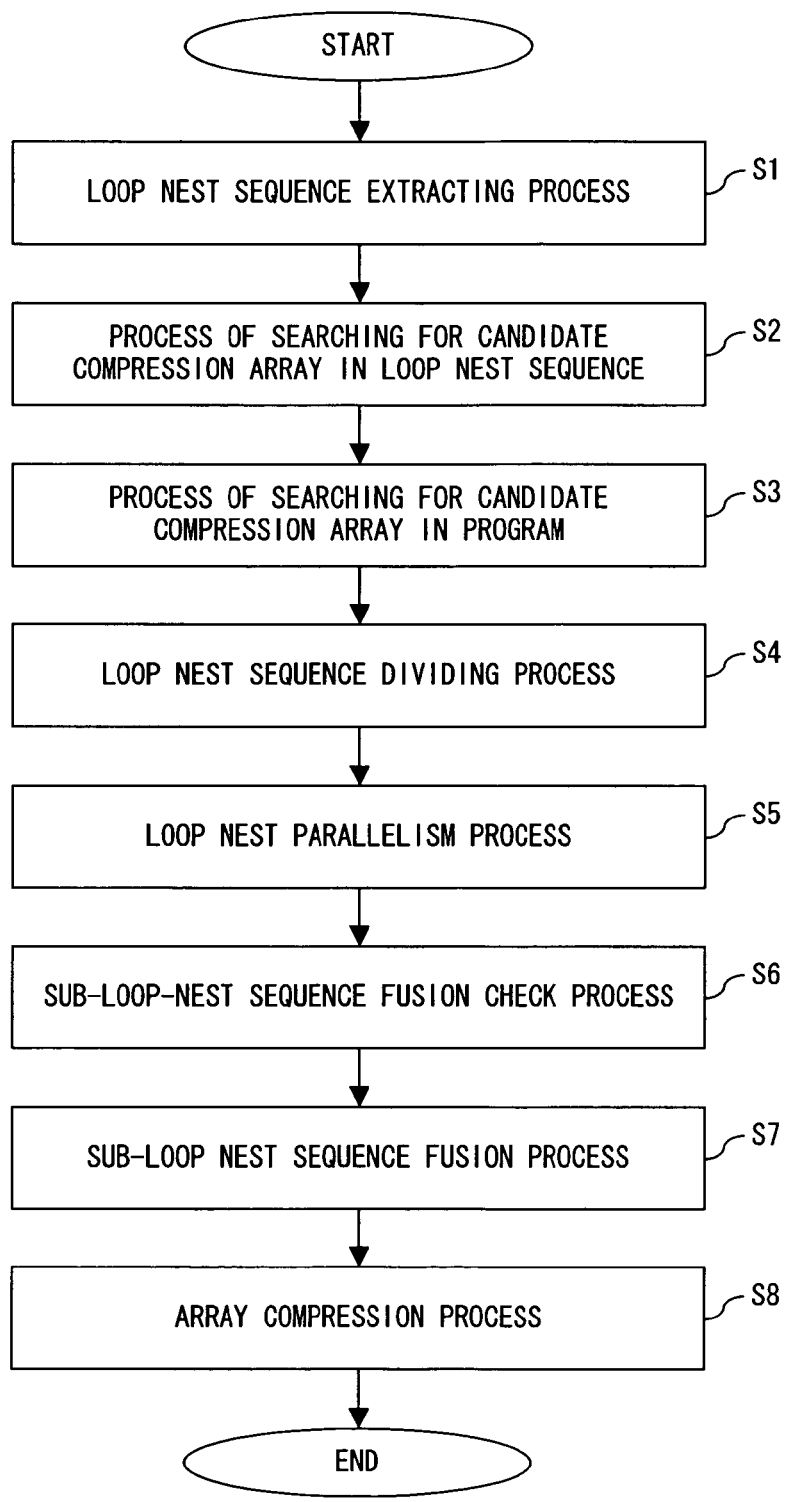
FIG. 9 is a flowchart of the entire array compression process.

FIG. 9 is a flowchart of the entire array compression process. As shown in FIG. 9, when the process starts, a loop nest sequence is first extracted in step S1, that is, the process of selecting a loop nest sequence from a program is performed. In step S2, a search for a candidate array for compression in a loop nest sequence is performed, that is, a candidate array for compression is searched for in a loop nest sequence. In this search, as described later, a candidate array for compression is searched for by checking whether or not the array is definition-preceded.

Then, in step S3, a search for a candidate array for compression in the entire program is performed. In this step, in the arrays which are candidate arrays for compression in each of the loop nest sequences in step S2, the array which is not a candidate array for compression in another loop nest sequence is excluded, and a search for a candidate array for compression is performed in the entire program.

In step S4, a loop nest sequence is divided into sub-loop-nest sequences. In this process, as described later, a loop nest sequence is divided before a loop nest whose array A is definition-preceded in the loop nest sequence, and a dividing process in which the loop nest sequence starting with the loop nest is a new sub-loop-nest sequence is performed.

In step S5, parallelism of loop nests is performed. In this process, conversion in which loops in the respective loop nests can be concurrently processed is performed. The parallelism is well known technology, but is further described later.

In step S6, a fusion check is made on a sub-loop-nest sequence. That is, it is checked whether or not a plurality of loop nests in a sub-loop-nest sequence can be fused into one loop nest. To check whether or not they can be fused, it is checked whether the direction of a loop, that is, a change of a variable of a loop, is a forward direction or a backward direction. A loop whose direction is to be inverted is determined as necessary.

As an order check, the order of loops in a nest is checked, and the conversion of the order is performed as necessary. Furthermore, as a check of parallelism, it is checked whether or not a sequential process is to be performed because the parallelism cannot be performed, as a result of fusion. When it is determined in the check that fusion cannot be performed, the fusion and the compression of an array only enabled by the fusion are not performed.

In step S7, loop nests in the sub-loop-nest sequences determined to be fused are fused into one loop nest. Finally in step S8, the arrays determined to be compressed are compressed, thereby terminating the process.

Figure 10:
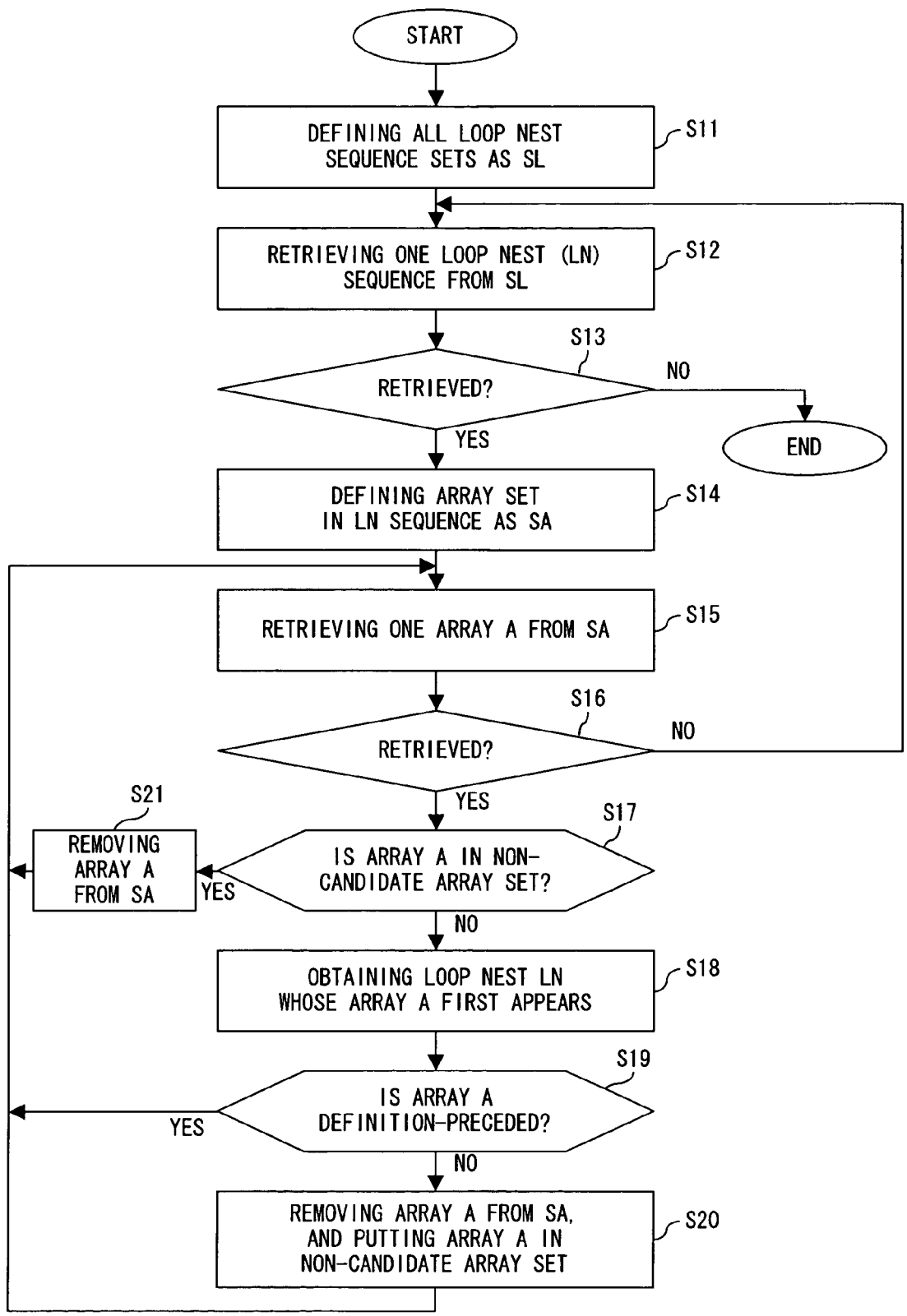
FIG. 10 is a flowchart of the process of searching for a candidate compression array in a loop nest sequence.

Described below in further detail is the process in each step shown in FIG. 9. FIG. 10 is a detailed flowchart of the process of searching for a candidate array for compression in a loop nest sequence. As shown in FIG. 10, when the process starts, a set of all loop nest sequences is defined as SL in step S11. In step S12, one loop nest (LN) sequence is retrieved from the set SL. It is determined in step S13 whether or not the LN sequence has been retrieved. If it has not been retrieved, then the process terminates.

If it has been retrieved, then a set of arrays in the loop nest sequence, that is, the LN sequence, is defined as SA in step S14. In step S15, an array A is retrieved from the set SA. It is determined in step S16 whether or not the array A has been retrieved. If it has not been retrieved, then the process on the loop nest sequence terminates, and the processes on the next loop nest sequence are repeated from step S12.

If the array A has been retrieved in step S16, it is determined in step S17 whether or not the array A is in a non-candidate array set, that is, a set of arrays which are not candidate arrays for compression. If yes, then the process on the array A terminates after removing the array A from the set SA in step S21, and the processes on the next array is repeated from step S15.

If the array A is not in the non-candidate array set in step S17, a loop nest LN whose array A first appears is obtained in step S18. In step S19, it is determined whether or not the array A is definition-preceded for the LN. If it is not definition-preceded, then the array A is removed from the set SA in step S20, the array A is put in a non-candidate array set, and the process from step S15 is repeated. If the array A is definition-preceded in step S19, then the process in step S20 is not performed, but the processes in and after step S15 are repeated.

FIG. 11 is a detailed flowchart of the process of searching for a candidate compression array in a program in step S3. As shown in FIG. 11, when the process starts, a set of all loop nest sequences is defined as SL in step S25. In step S26, a loop nest sequence is retrieved from the set SL. In step S27, it is determined whether or not a loop nest sequence has been retrieved, and the process terminates if it has not been retrieved.

If it has been retrieved, in step S28 it is determined whether or not there is a non-candidate array set, that is, an array in a set of arrays which are not to be compressed, in a set of arrays obtained as a result of removing arrays in steps 20 and 21 from a set SA for the LN sequence, that is, the arrays obtained for the LN sequence in step S14 shown in FIG. 10. If there is the array, it is removed from the set SA, and the processes in and after step S26 are repeated.

Figure 12:
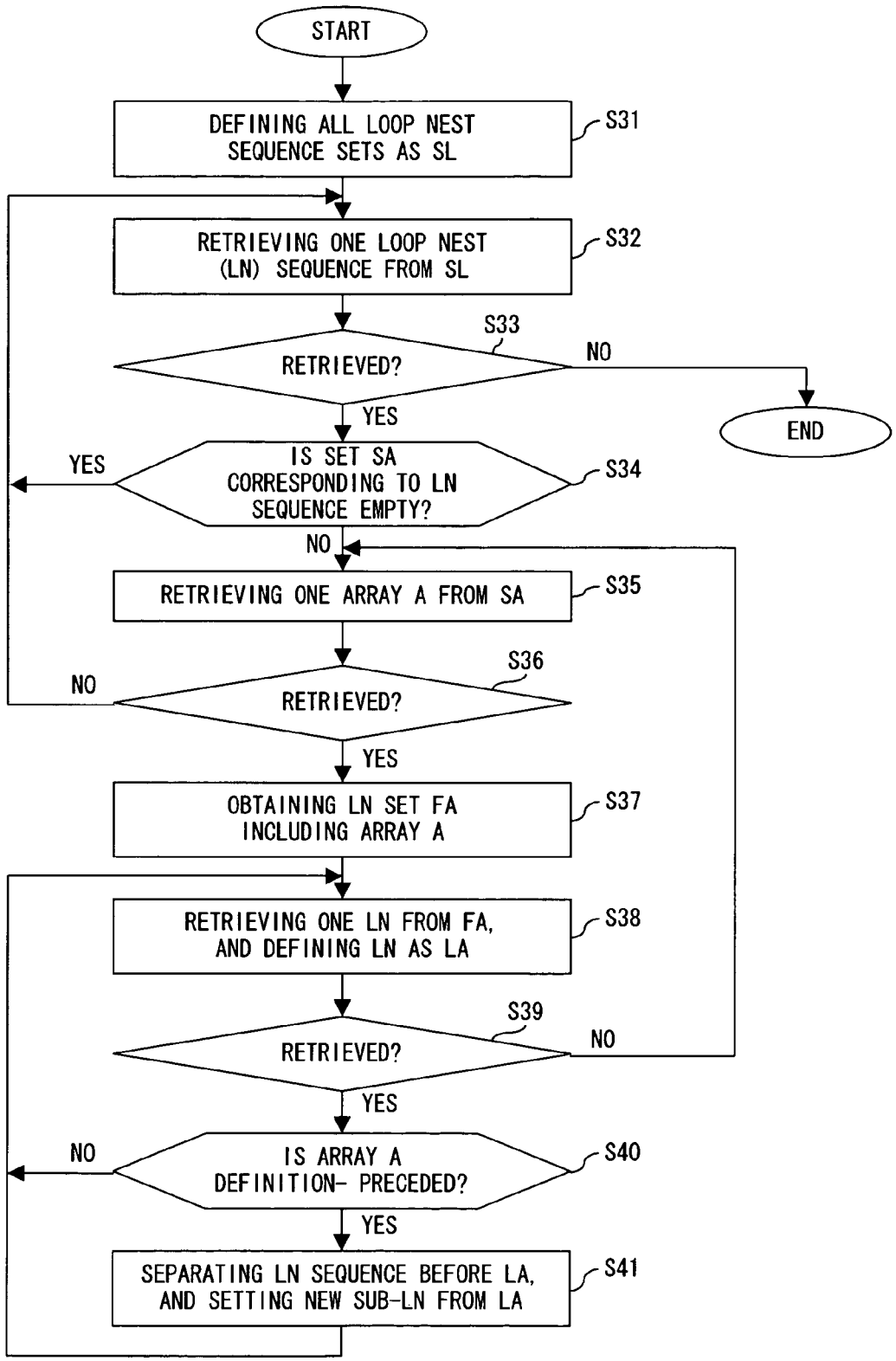
FIG. 12 is a flowchart of the loop nest sequence dividing process.

FIG. 12 is a detailed flowchart of the loop nest sequence dividing process in step S4 shown in FIG. 9. As shown in FIG. 12, when the process starts, a set of all loop nest sequences are defined as SL in step S31, a loop nest (LN) sequence is retrieved from the set SL in step S32. In step S33, it is determined whether or not the LN sequence has been retrieved. If it has not been retrieved, the process terminates.

If the LN sequence has been retrieved, it is determined whether or not the set SA corresponding to the LN sequence is empty in step S34. If it is empty, the processes of retrieving the next loop nest sequence in and after step S32 are repeated.

If the set SA is not empty, the array A is retrieved from SA in step S35, and it is determined in step S36 whether or not the array A has been retrieved. If it has not been retrieved, the processes in and after step S32 are repeated.

If it has been retrieved, a set FA of loop nests (LN) including the array A is obtained in step S37. In step S38, a (top) loop nest is retrieved from the set FA and defined as LA. In step S39, it is determined whether or not LA has been retrieved. If it has not been retrieved, the processes in and after step S35 of retrieving the next array A from the SA are repeated.

If the LA has been retrieved in step S39, it is determined in step S40 whether or not the array A is definition-preceded for the loop nest LA. If it is definition-preceded, then the loop nest sequence is separated before the loop nest LA in step S41, a new sub-loop-nest sequence starts from the LA, and then the processes in and after step S38 of retrieving the above-mentioned array LN are repeated. If the array A is not definition-preceded, then the processes in and after step S38 of retrieving the above-mentioned array LN are repeated.

Then, in step S5, the parallelism of loop nests is performed. The parallelism of loop nests is, for example, the process of loops respectively corresponding to J=1 to M in the leading loop nest described by referring to FIG. 1 it assigned to a plurality of processors, for example, M processors for concurrently performing the process. In this process, parallelism is performed such that multidimensional processes can be realized. In the multidimensional parallelism, for example, in a two-dimensional array, all processes on 1 through N for I and 1 through M for J can be performed in parallel.

In the parallelism, the conversion is performed such that the largest possible number of loops can be switched between forward and backward, and can be order-switched. The switch indicates that when the direction of a change of the variable of a loop is forward, it is inverted to backward, and when it is backward, it is inverted to forward. The order switch indicates that the order of loops is switched in the loop nests. After the conversion, the outermost N loops enclose all executable statements so that a conversion can be performed in an arbitrary order. The above-mentioned parallelism is described in the document by Ikuo Nakata "Configuration and Optimization of Compiler", page 409, published by Asakura Shoten, etc.

In step S6, a fusion check is made on a sub-loop-nest sequence. In this process, three checks, that is, a loop direction check of determining the loop to be inverted for the above-mentioned fusion, a loop order check of determining the loop to be order switched, and a parallelism check of no sequentially loop as a result of fusion, are performed. When fusion cannot be performed although it is necessary according to these checks to perform the fusion for array compression, the fusion of a sub-loop-nest sequence in step S7 and the array compression in step S8 are not performed on the loop nest in the sub-loop-nest sequence.

The above-mentioned fusion check is furthermore described below by referring to the example of the loop nest sequence shown in FIG. 13. In an N-dimensional parallel loop nest $L_n$, the outermost N loops are defined as $l=(l_1, \ldots, l_N)$, and the loop variable is defined as $l_v=(l_1, \ldots, l_{VN}) \ldots$ If $l_i$ ($1 \leq i \leq N$) can be doall parallel, then $l_i$ can be rotated both forward and backward. If it is pipeline parallel, it can be rotated only forward or backward. $l_{dvLn}$ is defined as the loop rotation direction vector.

$$l_{dvLn}=(e_1, \ldots, e_N)$$

where $$e_i = \begin{cases} \pm i & \text{(doall parallel enabled)} \\ +i & \text{(pipeline parallel enabled, and forward rotation)} \\ -i & \text{(pipeline parallel enabled, and backward rotation)} \end{cases}$$

"Doall parallelism" indicates parallelism requiring no synchronization among the processors when processes from J=1 to M are concurrently performed by assigning the processes to M processors. "Pipeline parallelism" indicates parallelism with restrictions, for example, performing the parallel process on I=2 after the parallel process on I=1, J=1 to M.

Also $pdv_{A:Ln}$ is defined as the following vector depending partial data for the M-dimensional array A in $L_n$.

$$pdv_{A:Ln}=(pdv_{A:Ln}(1), \ldots, pdv_{A:Ln}(M))$$

where each element:$pdv_{A:Ln}(i)$ is $pdv_{A:Ln}(i)=j$ when the coefficient of $l_{vj}$ in the subscript is positive, and $pdv_{A:Ln}(i)=-j$ when the coefficient of lvj in the subscript is negative, and when the loop variable lvj ($1 \leq i \leq N$) only appears in a subscript of the i-th dimension of the array A, all the subscripts of the i-th dimension of the array A in the loop nests are the same, no other loop variables appear in the subscripts of the i-th dimension; and in cases other than the case above, $pdv_{A:Ln}(i)=0$.

In the method according to the present invention, the loops parallelized in each loop nest are fused. The case in which only the M-dimensional array A is included in two loop nests $L_{n1}$ and $L_{n2}$ is considered.

$$pdv_{A:Ln1}(i)=i_1, pdv_{A:Ln1}(j)=j_1$$

$$pdv_{A:Ln2}(i)=i_2, pdv_{A:Ln2}(j)=j_2 \ (i \neq j)$$

With the above-mentioned conditions, the following descriptions hold.

(1) If $i_1=0$ and $i_2 \neq 0$, $i_2$ loop in $L_{n2}$ is not a target of fusion.
(2) If $i_1 \neq 0$ and $i_2=0$, $i_1$ loop in $L_{n1}$ is not a target of fusion.
(3) When $i_1 \neq 0$ and $i_2 \neq 0$, an $i_1$ loop and an $i_2$ loop can be fused if the sign of $i_1$ is the same as the sign of $i_2$.
(4) If the sign of $i_1$ is the same as the sign of $i_2$, the sign of $j_1$ is the same as the sign of $j_2$, and each of them is not 0, then $i_1$ and $i_2$, $j_1$, or $j_2$ can be fused by switching the loops between $i_1$ and $j_1$ or $i_2$ and $j_2$ if the collation between $|i_1|$ and $|j_1|$ and the collation between $|i_2|$ and $|i_2|$ are different.

If two loops relating to J and I are both doall parallelism in the loop $L_{n1}$ shown in FIG. 13, the loop rotation direction vector is ($\pm 1, \pm 2$).

Since J has 1 as the order of loop variables, and a subscript of two-dimension of the array, I has 2 as the order of loop variables, and a subscript of one-dimension of the array, and doall parallelism is enabled, the vector depending partial data of $L_{n1}$ using ± is represented as ($\pm 2, \pm 1$).

Similarly, $$ldv_{Ln1}=ldv_{Ln2}=(\pm 1, \pm 2)$$

$$pdv_{A:Ln1}=(\pm 2, \pm 1), pdv_{A:Ln2}=(\pm 2, \pm 1)$$

The case in which I and J loops are fused is considered. If the rotation direction of I and J loops of $L_{n2}$ are opposite each other, $$pdv_{A:Ln1}=(\pm 2, \pm 1), pdv_{A:Ln2}=(\mp 2, \mp 1)$$

The signs of the two elements of pdv are opposite each other as it is necessary to invert each loop of either loop nest. If the order of the nest of the loop of $L_{n2}$ is inverse, $$pdv_{A:Ln1}=(\pm 2, \pm 1), pdv_{A:Ln2}=(\pm 1, \pm 2)$$

The order of the two elements of pdv are opposite each other as it is necessary to switch loops for either loop nest for performing fusion.

In the above-mentioned process, loops are inverted and the order is switched for the fusion of sub-loop-nest sequences, loop nests in a sub-loop-nest sequence are fused into one loop nest in step S7, and, in the arrays defined as candidate arrays for compression in step S8 shown in FIG. 9, the array finally determined to be compressed is actually compressed.

Figure 14:
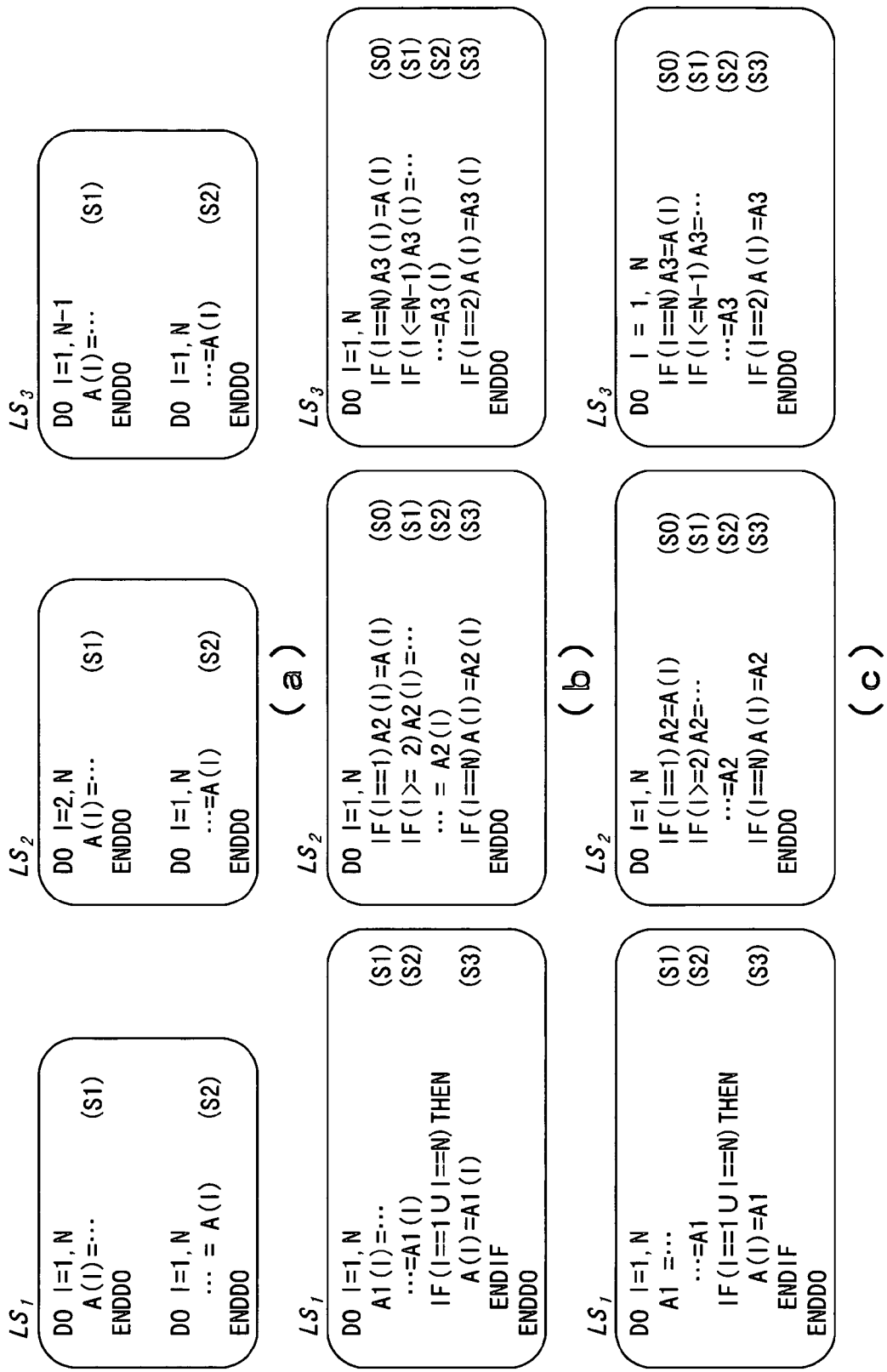
FIG. 14 shows an example of partial array compression.

FIG. 14 shows an example of partial compression of an array performed in step S8. FIG. 14(a) shows three loop nest sequences $LS_1$, $LS_2$, and $LS_3$. The array A includes nothing other than the three loop nest sequences in a program.

FIG. 14(a) can be converted into (b) in FIG. 14. In $LS_1$, the array A is replaced with A1 in (S1) and (S2), and the values of A(1) and A(N) are rewritten to the array A with the possibility of reference by $LS_2$ and $LS_3$ taken into account.

In (S0) of $LS_2$, the value of A(1) defined in any equation other than $LS_2$ is loaded from A(I) into A2(1). Since the value of A(1) is not updated in $LS_2$, only the value of A2(N) is rewritten to A(N) in (S3). $LS_3$ is converted as with $LS_2$.

Since A1, A2, and A3 shown in FIG. 14(b) are local arrays in the respective loop nest sequences, they can be compressed into scalar variables as shown by (c). Thus, although a part of elements are reference-preceded, array compression can be performed. This compression is referred to as partial compression while the conventional array compression is referred to as conventional compression.

If (S0) and (S3) are rarely performed in each loop nest sequence shown in FIG. 14(c), for example, access to an array in the memory is reduced, and most access relates to scalar variables, thereby improving the performance. That is, to improve the performance by partial compression, it is necessary to minimize reference-preceded elements in each loop nest sequence. Although it cannot be clearly stated how many reference-preceded elements can improve the performance, partial compression is performed, as it is regarded as realizing high improvement in performance if such elements amount to 5 to 10 or less of all elements.

However, the compression performed in step S8 is not limited to partial compression, but can include conventional performance. If an array is local in a loop nest sequence, it is obvious that conventional compression can also be applied to the array.

When it is assumed that no partial compression is performed, the array compression system is different from that shown in FIG. 9, but when the partial compression and conventional compression are used together, the system described above by referring to FIG. 9 is effective. If only the conventional compression can be performed in step S8, whether or not it is more effective to determine from the beginning not to use the partial compression depends on the realization system.

Figure 15:
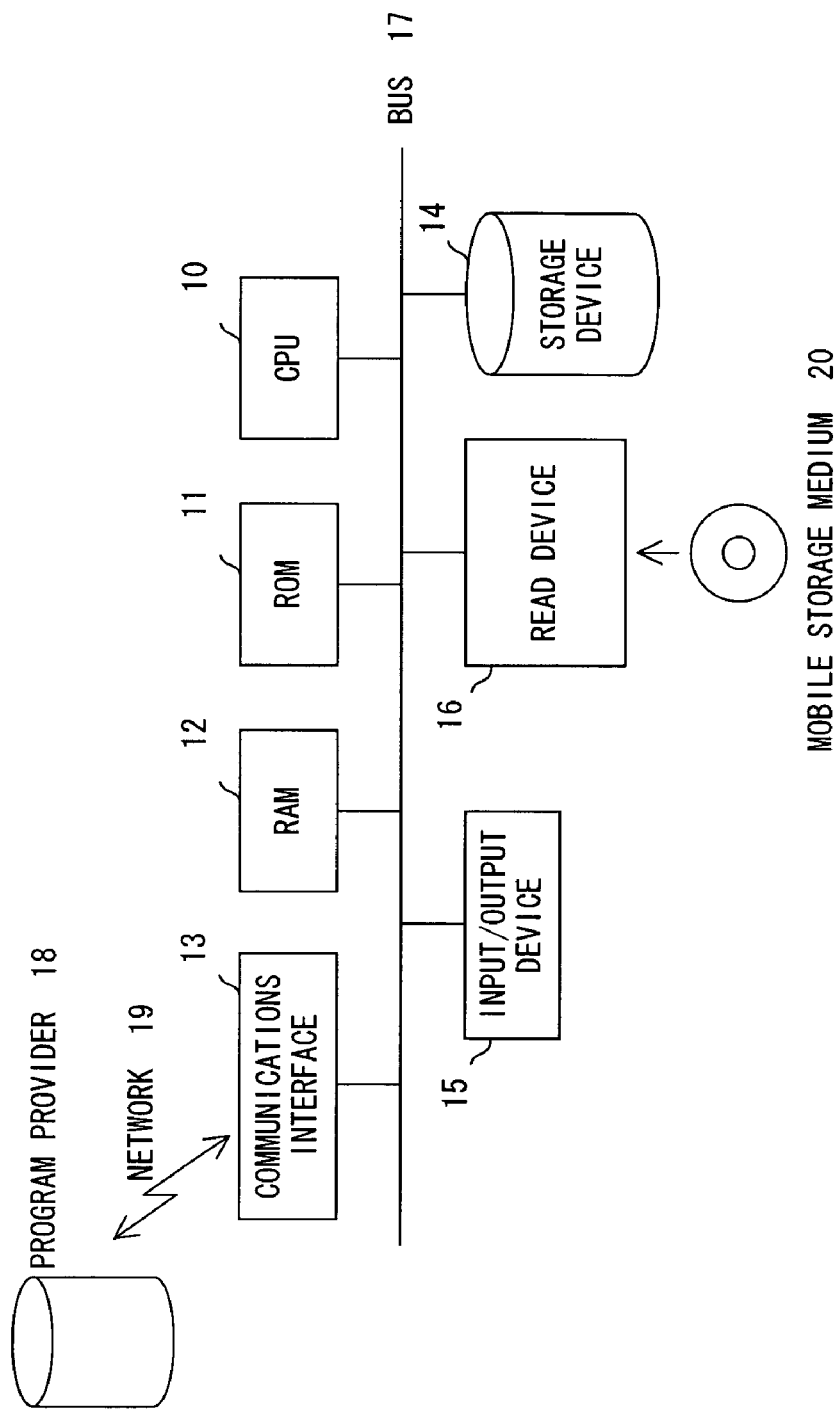
FIG. 15 is an explanatory view of loading a program to a computer according to the present invention.

The above-mentioned array compression system can be executed as a program by a computer after a program is generated and the program is stored in a storage device of the computer. FIG. 15 shows the operation of loading the program to a computer.

In FIG. 15, the computer system comprises a central processing unit (CPU) 10, read-only memory (ROM) 11, random access memory (RAM) 12, a communications interface 13, a storage device 14, an input/output device 15, a read device 16 for reading data from a mobile storage medium, and a bus 17 to which all of the above-mentioned components are connected.

The storage device 14 can be various storage devices such as a hard disk, a magnetic disk, etc. A program shown in the flowchart in FIGS. 9 through 12, and a program according to claim 10 of the present invention are stored in the storage device 14 or the ROM 11, and the programs are executed by the CPU 10, thereby realizing the array compression according to the present embodiment.

The above-mentioned programs can be, for example, stored in the storage device 14 through a network 19 and the communications interface 13 from a program provider 18, or stored in a mobile storage medium 20 marketed and distributed, set in the read device 16, and executed by the CPU 10. The mobile storage medium 20 can be various storage media such as CD-ROM, a flexible disk, an optical disk, a magneto-optic disk, etc. The program stored in the above-mentioned mobile storage media is read by the read device 16, thereby performing the process from executing a loop nest sequence to performing array compression as shown in FIG. 9.

As described above in detail, the partial compression is performed on an array including a large number of definition-preceded elements in an array compression system according to the present invention so that the size of the array can be reduced, the requirement of the memory can be reduced, and the locality can be improved. Especially by combining the fusion of loops, an increasing number of opportunities of applying compression has enhanced the effect of compression, thereby largely contributing to the improvement of the performance of a computer.

What is claimed is:

1. An array compression method, performed by a computer, for reducing a size of an array, the method comprising:
   reading a program stored in a storage device;
   obtaining a loop nest, the array of the loop nest first appearing in a loop nest sequence in the program;
   defining the array as a candidate array for partial compression in the loop nest sequence when the array is a definition-preceded array including elements preceded by a definition for the loop nest and the elements being referenced after the definition;
   dividing the loop nest sequence into sub-loop-nest sequences each of which includes a lead loop nest in which the definition-preceded array is expressed;
   checking whether a plurality of loop nests in the sub-loop-nest sequence can be fused into one loop nest;
   fusing the plurality of loop nests into one loop nest when indicated that the plurality of loop nests can be fused into one loop nest as a result of the checking;
   performing partial compression by replacing local elements of the candidate array with scalar variables; and
   describing a referencing of a value of a non-local element stored in a memorizing unit and a redefining of the non-local element using the referred value in the loop nest.

2. The method according to claim 1, wherein
   in a search for a candidate array for compression in a program performed between a search for a candidate array for compression in the loop nest sequence and the partial compression,
   when a candidate array for compression in the loop nest sequence is not defined as a candidate array for compression in another loop nest sequence in a program, the array is removed from candidate arrays for compression.

3. The method according to claim 1, wherein
   in a fusion check of a loop nest in a sub-loop-nest sequence performed between division into the sub-loop-nest sequences and partial compression,
   a loop for inverting a rotation direction for fusion of a loop nest in a sub-loop-nest sequence can be determined according to information about the rotation direction, that is, a forward direction or a backward direction, indicating a change direction of a variable of each loop, and a position of occurrence of the loop variable in subscripts of a candidate array for compression; and a loop nest for inverting an order of loops can be determined according to information about an order of loops in each loop nest, and a position of occurrence of a loop variable in subscripts of a candidate array for compression.

4. A computer-readable recording medium encoded with a program that when executed causes a computer to perform an array compression method to reduce a size of an array in a program, said method comprising:

reading a target program from a storage device;

obtaining a loop nest, the array of the loop nest first appearing in a loop nest sequence in the program;

defining the array as a candidate array for partial compression in the loop nest sequence when the array is a definition-preceded array including elements preceded by a definition for the loop nest and the elements being referenced after the definition;

dividing the loop nest sequence into sub-loop-nest sequences each of which includes a lead loop nest in which the definition-preceded array is expressed;

checking whether a plurality of loop nests in the sub-loop-nest sequence can be fused into one loop nest;

fusing the plurality of loop nests into one loop nest when indicated that the plurality of loop nests can be fused into one loop nest as a result of the checking;

performing partial compression by replacing local elements of the candidate array with scalar variables; and describing a referencing of a value of a non-local element stored in a memorizing unit and a redefining of the non-local element using the referred value in the loop nest.

* * * * *